Patented Aug. 15, 1944

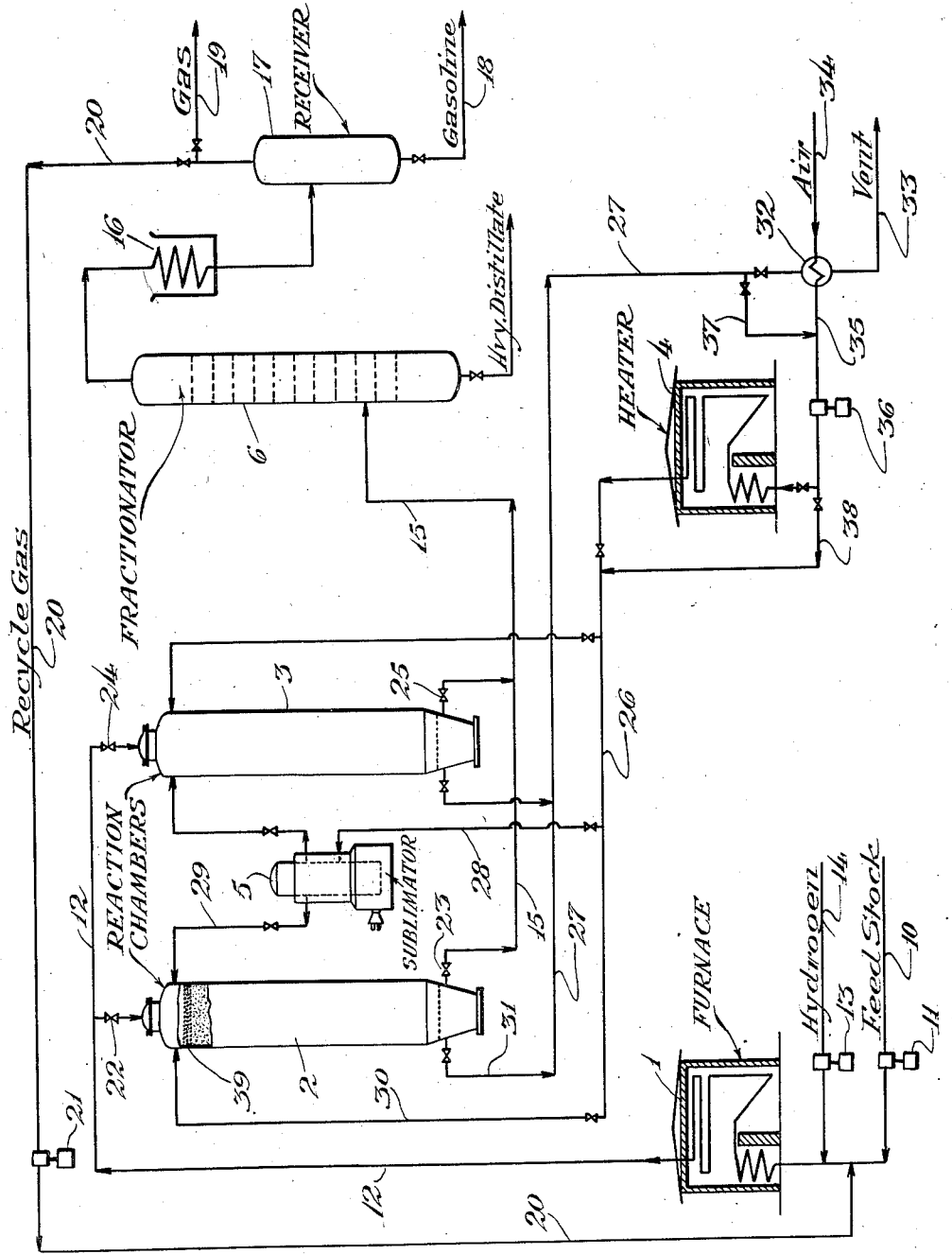

2,355,831

UNITED STATES PATENT OFFICE 2,355,831

ACTIVATION OF CATALYSTS

Vanderveer Voorhees, Homewood, Ill., assignor to Standard Oil Company, Chicago, Ill., a corporation of Indiana Application October 23, 1941, Serial No. 416,246

10 Claims. (Cl. 196—52)

This invention relates to the catalytic conversion of hydrocarbons and more particularly to the conversion of naphthas of low knock rating into high knock rating gasoline. It relates to conversion of hydrocarbons by contacting with porous solid catalysts at high conversion temperatures and more specifically, the invention relates to the catalytic conversion of hydrocarbon oils in the vapor phase in contact with solid catalysts containing as promoters certain metal oxides having a tendency to sublime.

One object of the invention is to improve the conversion of hydrocarbons in contact with catalytic oxides which normally suffer losses by sublimation. Another object of the invention is to provide a convenient and economical method of applying promoters to hydrocarbon conversion catalysts and particularly reforming catalysts.

The invention is illustrated by a drawing which shows diagrammatically an apparatus for carrying out the process.

It has been found that in the reforming and hydroforming of heavy naphthas when employing an oxide of molybdenum or chromium the activity of the catalyst diminishes progressively to a point where conversion of the hydrocarbon becomes significantly lower as the age of the catalyst increases. It is necessary to discard the catalyst and replace it with fresh catalyst. In the case of an aluminum oxide catalyst promoted with 8.7% of molybdenum, for example, the molybdenum content of the catalyst diminished to 7.5% in a relatively short time of operation. Investigation showed that this was apparently due to sublimation of the molybdenum oxide from the catalyst support, probably, during the regeneration period when maximum temperatures prevailed. In a typical operation of this kind, heavy naphtha vapors mixed with about 1 to 5 mols of hydrogen are passed through the catalyst at a temperature of about between 850 and 1050° F., for example, at 975° F. and a space velocity of the order of 1 to 2 volumes of naphtha per hour per volume of catalyst. The pressure employed is usually in the range of 50 to 500 pounds per square inch. The preferred catalyst is activated aluminum oxide intimately associated with one of the oxides of the metals of the left column of groups V and VI of the periodic system which have the property of subliming, especially in their higher states of oxidation. The amount of the promoter oxide present on the alumina will usually be in the approximate range of 5 to 25%, 10% being commonly employed. Although alumina is the preferred support for this catalyst, certain other oxides may be employed, particularly the oxides of magnesium, titanium and thorium.

In preparing these catalysts with sublimable oxides, the promoter metal oxides or hydroxides may be co-precipitated with the catalyst body from aqueous solutions, for example, by adding ammonia to the desired metal salts, followed by washing, drying and igniting the product. Thus, a solution of molybdenum sulfate and aluminum sulfate may be precipitated with ammonia. When using the chlorides, it is not necessary to wash out the ammonium chloride which is volatile and this is also true of other salts which are easily volatilized.

Another method of preparing the catalyst is to deposit the promoter on the support, for example, active alumina, bauxite, alumina gel, etc., either by precipitation or by impregnation with a solution of the nitrate, for example, or an ammonium salt of the promoter metal oxygen acid. Thus, molybdenum nitrate or ammonium molybdate may be impregnated into activated alumina and then dried and ignited to convert the molybdenum to the oxide.

According to my invention, I may also introduce the promoter metal oxide into the alumina or other supporting material by subliming at elevated temperature in a current of hot gas and passing the stream of gas bearing the metal oxide vapor through the alumina support suitably contained in a granular bed. The volatile metal oxide is adsorbed from the gas into the pores and on the surface of the active alumina or other supporting material, thereby effecting the desired activation. However, my invention relates primarily to preventing deterioration or restoring the activity of the catalyst which has suffered deterioration in use. My invention will be more readily understood by referring to the accompanying drawing, which is a simplified flow diagram omitting various detailed equipment, the use of which will be apparent to those skilled in the art.

In the drawing, furnace 1, which may be suitably a conventional pipe furnace, is employed to heat the hydrocarbon feed stock. Reaction chambers 2 and 3 contain the conversion catalyst and are used alternately, the catalyst being regenerated in one while the other is in operation. Heater 4 is provided to supply heat to the regeneration gases. Its use is optional. Sublimator drum 5 contains the metal oxide promoter to be sublimed into the catalyst during regeneration. Fractionator 6 effects an initial separation of the products of the reaction. A typical operation of the process is as follows: A mid-continent virgin heavy naphtha having an octane number of about 40 A. S. T. M. and a boiling range of about 325 to 450° F. is charged to the system by line 10 and pump 11. In furnace 1 it is vaporized and heated to the desired conversion temperature or somewhat above and the vapors are conducted by line 12 to reactor 2. About 3 mols of hydrogen per mol of feed are introduced by pump 13 and line 14, passing through the heater with the feed stock. The mixture of hydrogen and hydrocarbon vapors passes down through reactor 2 in contact with the granular catalyst therein which may be granules of active alumina promoted with 8 to 10% of chromium oxide or molybdenum oxide or a mixture of the two. Granules employed for this purpose may conveniently have a particle size of ¼ to 60 mesh, fine material being avoided to prevent plugging and excessive pressure drop in passing through the reactor. Space velocities (V. H. V.) may be about ⅕ to 5 volumes of liquid feed per hour per apparent volume of catalyst. A space velocity of 1 to 2 volumes per hour per volume of catalyst is typical. A temperature of 925 to 975° F. and a pressure of about 200 to 400 pounds per square inch may be employed.

The hydrocarbon vapors and hydrogen pass out of the bottom of the reactor through a suitable, perforated supporting diaphragm and are conducted by line 15 to fractionator 6 where heavy constituents are condensed and separated from gasoline and lighter products. The gasoline is condensed in condenser 16 and collected in receiver 17 whence it is withdrawn by line 18. Uncondensed gases are withdrawn by line 19 but a large part of the uncondensed gases may be recycled by line 20 and blower 21 to the conversion system. The hydrogen contained in these gases may amount to 25 to 75 volume percent and it supplements or may conveniently replace the hydrogen introduced at 13, a larger amount of the gases being employed in the latter case to maintain the desired hydrogen to hydrocarbon ratio.

After the catalyst in reactor 2 has suffered a substantial loss of activity, primarily from the deposition of carbonaceous matter thereon, the flow of vapors through it is interrupted by closing valves 22 and 23 and opening valves 24 and 25, thereby diverting the stream through reactor 3 in which the catalyst has been restored to activity. While the catalyst in reactor 2 is still hot regeneration is begun by introducing heated regeneration gas by line 26. The hot regeneration gas containing oxygen passes through a bed of catalyst in reactor 2 and is conducted away by line 27. A portion of the regeneration gas may be conducted by valved line 28 to subliming chamber 5 where it collects volatile metal oxides and conducts them through line 29 to reactor 2 in contact with the catalyst there. During the regeneration of the catalyst the temperature may be of the order of 1000 to 1400° F. or even higher, e. g., 1600° F. A temperature of 1100 to 1200° F. is generally not exceeded since an excessively high temperature during regeneration of the catalyst impairs its activity more or less permanently.

When employing a molybdenum oxide promoted catalyst in reactor 2, I may employ molybdenum trioxide in sublimation chamber 5 and I may heat the chamber 5 externally to a temperature of about 1100 to 1500° F. or higher to sublime a portion of the molybdenum oxide and disperse it in the vapors passing out through 29 into reactor 2. In reactor 2 the molybdenum oxide vapors introduced during regeneration and preferably during the entire period of regeneration, are deposited on the catalyst therein and prevent a net loss of molybdenum oxide by sublimation. Otherwise, loss of molybdenum oxide occurs during each regeneration period of the cycle impoverishing the catalyst of this ingredient. It further appears that molybdenum oxide lost from the catalyst by sublimation is lost principally from the active centers of the catalyst and the resulting loss of catalyst efficiency is greater than would be expected from the amount of promoter removed. It is an object of this invention to maintain in the regeneration gases sufficient promoter oxide vapors for saturation, thereby preventing sublimation of the promoter oxide from active centers of the catalyst.

A stream of oxygen-containing regeneration gases entering the top of the reactor 2 by lines 29 and 30 passes downward through the catalyst and effects removal of carbon therefrom by combustion, care being taken to avoid local overheating above the desired regeneration temperature, for example, 1100° F. Spent regeneration gases depart by line 31 connecting with manifold 27 and flow thence through exchanger 32 to discharge line 33. Air supplying oxygen for regeneration may be admitted by line 34 and heated in exchanger 32, thence conducted by line 35 to blower 36 which forces it through the furnace 4 as hereinabove mentioned. Spent regeneration gases may be recycled through valved line 37 to control the amount of oxygen in the fresh regeneration gas as desired.

It is not always necessary to heat the regeneration gas and in fact heater 4 may be substituted or supplemented by a cooler or the regeneration gases may by-pass the heater by line 38. In fact, the necessity of dissipating heat from the catalyst during regeneration encourages supplying cool regeneration gases after the regeneration reaction has been inaugurated. When regenerating with cool gases, for example, gases having a temperature below 900° F., it is advisable to raise the temperature of the regeneration gases at the end of the regeneration step to 1000° F. or 1100° F., thereabout, and have them saturated with promoter oxide at that temperature. In that way an additional supply of the promoter oxide is furnished to the catalyst to offset any depletion which has occurred.

When the catalyst in reactor 2 has been regenerated and the catalyst in reactor 3 has become deactivated, the operations of conversion and regeneration may be reversed, reactor 2 being employed for conversion of hydrocarbons as previously described and the catalyst in reactor 3 being regenerated in the same manner as just described for reactor 2. More reactors may be employed in the system and regenerated in rotation.

Instead of introducing the sublimable metal oxide promoter by means of a subliming chamber as above described, I may simply apply a layer of the promoter oxide to the surface of the catalyst bed in the reactor as shown in the cut-away section of reactor 2 wherein a layer of granular molybdenum oxide is indicated at 39. A layer of catalyst may be placed above the layer of promoter oxide if desired to insure that the oxide be effectively heated to subliming temperature by the combustion of carbonaceous deposits on the catalyst during regeneration. Likewise, layers of promoter oxide may be alternated with catalyst layers throughout the catalyst bed if desired. I also contemplate conducting the flow of gases upwardly through the reactor in which case I may introduce the sublimable metal oxide promoter at the bottom of the reactor. I also contemplate introducing the promoter metal oxide periodically during the operation of the process rather than continuously with each regeneration.

Having thus described my invention what I claim is:

1. In the process of converting hydrocarbons by contacting at a high conversion temperature with a solid conversion catalyst containing as an essential ingredient a sublimable metal oxide which is unavoidably lost from the catalyst by sublimation, the improvement comprising periodically restoring the sublimable metal oxide to the catalyst by passing through said catalyst, gas, at a high temperature, containing vapors of said metal oxide.

2. The process of claim 1 wherein said sublimable metal oxide is an oxide of chromium.

3. The process of claim 1 wherein said sublimable metal oxide is an oxide of molybdenum.

4. In the process of converting hydrocarbon oils wherein the vapors of an oil are subjected at conversion temperature to the action of a solid metal oxide catalyst containing as an essential ingredient a sublimable metal oxide promoter and wherein said catalyst is periodically regenerated by combustion with an oxidizing regeneration gas at an elevated temperature to remove carbonaceous deposits and said promoter oxide is unavoidably lost from said catalyst by sublimation during said regeneration, the improvement comprising saturating said regeneration gas with the vapors of said promoter oxide while introducing it into said catalyst, thereby retarding the vaporization of the promoter from said catalyst.

5. The process of claim 4 wherein said catalyst is alumina promoted with chromium oxide.

6. The process of claim 4 wherein said catalyst is alumina promoted with molybdenum oxide.

7. The process of claim 4 wherein said catalyst is alumina promoted with vanadium oxide.

8. The process of claim 4 wherein said catalyst consists essentially of active aluminum oxide and an amount of said sublimable metal oxide promoter within the approximate range of 5 to 25%.

9. The process of reforming low knock rating heavy naphtha which comprises vaporizing the naphtha and subjecting the vapors in the presence of hydrogen to the action of a catalyst consisting essentially of active aluminum oxide and a sublimable metal oxide promoter, maintaining a reaction temperature of about between 850 and 1050° F., maintaining a pressure of about between 50 and 400 pounds per square inch and a space velocity of about 1 to 2 V. H. V., continuing the passage of naphtha vapors and hydrogen through said catalyst until its activity is substantially impaired, interrupting the flow of naphtha vapors and regenerating said catalyst by passing an oxygen-containing regeneration gas therethrough, maintaining the temperature of said catalyst during regeneration at a point between about 1000 and 1200° F., continuing the regeneration until carbonaceous deposits are substantially removed from said catalyst by combustion and substantially preventing the loss of the sublimable metal oxide promoter from said catalyst by dispersing in said regeneration gases before contacting with said catalyst additional amounts of said sublimable metal oxide promoter in vapor form.

10. The process of claim 9 wherein said promoter is an oxide of molybdenum.

VANDERVEER VOORHEES.